United States Patent Office 3,708,545
Patented Jan. 2, 1973

3,708,545
PROCESS FOR THE PREPARATION OF p-NITROPHENOL AND METAL SALTS THEREOF USING AMMONIA TO CONTROL THE ISOMER DISTRIBUTION
Edward Noonan Squire, Glen Mills, Pa., assignor to E. I. du Pont de Nemours and Company, Wilmington, Del.
No Drawing. Filed Feb. 11, 1969, Ser. No. 798,435
Int. Cl. C07c 79/24
U.S. Cl. 260—622 R
4 Claims

ABSTRACT OF THE DISCLOSURE

A process for the preparation of p-nitrophenol and metal salts thereof which comprises agitating nitrobenzene, metal hydroxide, ammonia and optionally oxygen for preparation of the metal salt and acidification of the metal salt for the preparation of the p-nitrophenol.

---

This invention relates to a process for the preparation of p-nitrophenol and metal salts thereof. More particularly, this invention relates to a process for the preparation of p-nitrophenol and metal salts thereof using ammonia to control the isomer distribution.

Previously used processes for the preparation of the metal salts of the nitrophenols have involved more steps and/or have resulted in the production of more o-nitrophenol than p-nitrophenol. These processes include (a) a three step process for producing the metal salts of the ortho and para nitrophenols from benzene which comprises chlorinating the benzene to form chlorobenzene, nitrating the chlorobenzene to form ortho and para chloronitrobenzene, and forming the metal salts of the ortho and para nitrophenols by replacing the —Cl in the chloronitrobenzene; and (b) a one step process for producing the metal salts of the ortho and para nitrophenols from nitrobenzene which consists of converting the nitrobenzene to the metal salts of the nitrophenols using metal hydroxides. Both of the processes result in more ortho than para metal salt of nitrophenol.

It has now been discovered that the use of ammonia with the metal hydroxide in a one step process for producing the metal salts of the ortho and para nitrophenols from nitrobenzene will direct isomer distribution such that more of the para metal salt of the nitrophenol will be formed than was produced in the previously used processes.

The invention then is a process for the preparation of the metal salts of p-nitrophenol from nitrobenzene which comprises agitating said nitrobenzene with (a) a metal hydroxide selected from the class consisting of potassium hydroxide, cesium hydroxide, and rubidium hydroxide and (b) a member selected from the class consisting of ammonia and ammonia plus oxygen to form a product mixture. This product mixture may then be separated into the metal salt of the p-nitrophenol and the remainder of the product mixture. However, if the p-nitrophenol is to be produced the additional steps of acidification with an acid selected from the group consisting of hydrochloric acid, sulfuric acid, nitric acid, phosphoric acid, acetic acid, propanoic acid, butanoic acid, benzoic acid and carbon dioxide plus water and separating the p-nitrophenol thus formed from the acidified mixture are required.

The molar ratio of the ammonia to nitrobenzene preferably ranges from 3⅓:1 to 30:1; the molar ratio of metal hydroxide to nitrobenzene preferably ranges from ⅓:1 to 5:1, and the molar ratio of oxygen to nitrobenzene preferably ranges from 0:1 to 10:1.

The oxygen may be included to offset reduction of the nitrobenzene at more vigorous reaction conditions. The metals used are those capable of forming an oxide containing the $O_2^-$ ion. This ion has appeared to be effective in producing the hydroxylation reaction on the nitrobenzene. These metals are introduced in their hydroxide forms.

The temperature of the process is not critical and can vary from 8° C. to 200° C. with the preferred temperature being from 20° C. to 85° C. The process is normally carried out in a closed container under no external pressure after the introduction of the reactants. Thus any pressure increase during agitation is autogenous. If oxygen is to be used, the container is pressurized with oxygen before agitation. The oxygen temperature as it is introduced into the container is usually from —40° C. to —50° C. and its pressure usually varies from 1 to 400 atmospheres with the preferred range being from 1 to 70 atmospheres although these temperatures and pressures are not critical. The external oxygen pressure is removed before agitation and any pressure increase in the container during agitation is autogenous.

In the acidification step, the concentration in water of the acids before they are introduced into the metal salt of furic acid, nitric acid, phosphoric acid, acetic acid, propanoic acid and butanoic acid can be used at concentrations of 1–50% with the preferred range being 5–10%. The benzoic acid concentration can range from 0.2 to 2.2%. These concentrations refer to the concentrations of the acids before they are introduced into the metal salt of p-nitrophenol mixture. The amount of the acid added need only be that which is necessary to entirely convert the metal salt of the p-nitrophenol to p-nitrophenol. However, when hydrochloric acid, sulfuric acid, and phosphoric acid are used, a sufficient amount of acid can be used such that the pH of the acidified mixture reaches 1–2.

The metal salts of the p-nitrophenol may be used in the preparation of intermediates such as dinitro-diphenyl ether for use in high temperature polymers. Further, they may be used to produce p-nitrophenol which has a multitude of well-known uses.

The following examples illustrate but do not limit the invention. All parts are by weight unless otherwise specified.

EXAMPLE I

A 180 ml. stainless steel shaker tube was charged with 0.2 mole nitrobenzene and 0.17 g. at. weight powdered potassium hydroxide. The tube was cooled and evacuated. Three moles of ammonia were then charged into the tube. With shaking of the tube at 84 strokes/min., the temperature of the reactants was raised to 75° C. It was held at this temperature for 3 hours. The tube was cooled to room temperature and discharged. The product mixture containing the potassium salts of the ortho and para nitrophenol was then acidified with dilute hydrochloric acid to a pH of 1–2, extracted with ether and dried over sodium sulfate. The ether solution was analyzed via a gas chromatograph and was found to contain 95.5 mole percent para and 4.5 mole percent ortho nitrophenol.

EXAMPLE II

Using the procedure described in Example I, 0.3 mole nitrobenzene and 0.1 mole cesium hydroxide were charged into a 180 ml. stainless steel shaker tube which was then evacuated and cooled. One mole of ammonia was charged into said tube and the tube was pressurized to 70 atmospheres with oxygen at about —40° C. corresponding to approximately 0.4 mole of oxygen. The tube was shaken 8 hours at room temperature and the product mixture was divided into two equal lots. Lot 1 was separated and analyzed as in Example I. The analysis showed 84.8 mole percent para and 15.2 mole percent ortho-nitrophenol. The conversion to nitrophenols based on the cesium hydroxide was 15 mole percent.

EXAMPLE III

Lot 2 of Example II was stirred into about 70 ml. of distilled water. The aqueous layer was then extracted with ethyl ether to remove the residual nitrobenzene and leave the cesium salts of the nitrophenols in the aqueous layer.

The stirred aqueous layer was then saturated with carbon dioxide at atmospheric pressure and room temperature by the periodic addition of Dry Ice pellets into the mixture for one hour. The aqueous-carbon dioxide mixture was extracted with three 30 ml. portions of ethyl ether. 88 percent of the nitrophenols in the aqueous layer were recovered in the three ether extractions. The aqueous layer was acidified to a pH of 1-2 with 20 percent hydrochloric acid and extracted with three 30 ml. portions of ethyl ether. The remainder of the nitrophenols was recovered from aqueous phase by these extractions.

I claim:

1. A process for the preparation of metal salts of p-nitrophenol from nitrobenzene which comprises agitating at from 8° C. to 200° C. said nitrobenzene with (a) a metal hydroxide selected from the class consisting of potassium hydroxide, cesium hydroxide, and rubidium hydroxide and (b) a member selected from the class consisting of ammonia and ammonia plus oxygen to form a product mixture; the molar ratio of ammonia to nitrobenzene being from 3⅓:1 to 30:1; the molar ratio of metal hydroxide to nitrobenzene being from ⅓:1 to 5:1 and the molar ratio of oxygen to nitrobenzene being from 0:1 to 10:1.

2. The process of claim 1 with the further step of separating said salt of p-nitrophenol from the remainder of the product mixture.

3. The process of claim 1 with the additional step of converting the metal salt of the p-nitrophenol to p-nitrophenol by acidification with an acid selected from the group consisting of hydrochloric acid, sulfuric acid, nitric acid, phosphoric acid, acetic acid, propanoic acid, butanoic acid, benzoic acid and carbon dioxide plus water and separating the p-nitrophenol thus formed from the acidified mixture.

4. The process of claim 1 in which the temperature is 20° C. to 85° C.

References Cited

UNITED STATES PATENTS

| | | | |
|---|---|---|---|
| 3,283,011 | 11/1966 | Cox | 260—622 R |
| 3,461,173 | 8/1969 | Peterson | 260—622 P |
| 3,468,963 | 9/1969 | Liechti et al. | 260—622 R |

FOREIGN PATENTS

| | | | |
|---|---|---|---|
| 16,619 | 9/1967 | Japan | 260—622 |

BERNARD HELFIN, Primary Examiner

W. B. LONE, Assistant Examiner